United States Patent

[11] 3,613,068

[72] Inventors John H. Thompson
Pittsburgh, Pa.;
Charles B. Durgin, Rochester, N.Y.; Dale
D. Skinner, Turtle Creek, Pa.
[21] Appl. No. 839,796
[22] Filed June 30, 1969
[45] Patented Oct. 12, 1971
[73] Assignee The United States of America as
represented by the Secretary of the Navy

[54] DEVICE FOR COUPLING A TRANSDUCER TO A TRANSMITTER AND RECEIVER (U)
4 Claims, 2 Drawing Figs.
[52] U.S. Cl. .................................................. 340/3 R
[51] Int. Cl. .................................................. G01s 9/66
[50] Field of Search .......................................... 340/3, 3 V

[56] References Cited
UNITED STATES PATENTS
3,102,991 9/1963 Jess .............................. 340/3
3,414,872 12/1968 Barron .......................... 340/3
Primary Examiner—Richard A. Farley
Attorneys—J. P. Dunlavey, E. F. Johnston and T. G. Keough ABSTRACT: The large capacitive reactance of piezoelectric materials such as, barium titanate, Rochelle salt, or quartz, that are used as the driving elements in transducers has required large inductances to bring the power factor to unity to ensure efficient power transfer between a transducer and a transceiver. A transmitter-transformer couples a transmitter to the transducer, at high-energy output levels, and a series connected receiver-transformer, tuned to pass signals with an identical frequency characteristic at significantly lower levels of energy, eliminates a problem arising when one transformer is used. When employing a single transformer having a high permeability core, its inductance varies when the transformer transfer energy separated levels of energy thusly changing the tuning of associated circuits at these different levels of operation. Shunting switches across the transmitter-transformer winding and the receiver-transformer winding, enable the selective disconnection of either of the transformers from a common coupling circuit when the other mode of operation is proceeding. A pair of back-to-back diodes forming the shunting circuit across the primary of the receiver-transformer, have a forward voltage drop greater than the magnitude of the received signal to ensure the transfer of received signals when they appear across the primary winding. These same diodes have a forward voltage drop far below the level of the high-power output appearing across the secondary winding of the transmitter-transformer to ensure that this signal is shorted around the primary of the receiver-transformer to eliminate the possibility of damaging the inherently more delicate receiver-transformer.

PATENTED OCT 12 1971

3,613,068

INVENTORS
JOHN H. THOMPSON
CHARLES B. DURGIN
BY DALE D. SKINNER
Thomas G. Keough
Ervin F. Johnston
ATTORNEYS

DEVICE FOR COUPLING A TRANSDUCER TO A TRANSMITTER AND RECEIVER (U)

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Transducers using piezoelectric driving elements have long presented an unavoidable problem to designers, that is, correcting the bad power factor existing within transducer-transceiver systems. The piezoceramics, by reason of being stacked in alternate layers with conductor strips, present a large capacitive reactance to the system. Heretofore, it has been the practice to correct the power factor by adding a series of inductors, usually in the form of transformer windings. Since a single transducer requires relatively high levels of driving power when transmitting, but yet, when used in the receiving mode, provides output signals of relatively low level, inductance provided by a single coupling transformer as the power level varies to alter the band-pass and frequency characteristics of the system. This is largely due to the permeability-nonlinearity in the transformer's core that changes inductance as the applied potential changes. As a result, the unity power factor or circuit resonance or other desired frequency-power characteristics are not uniform over an entire or anticipated range of operation. From a design standpoint, it is usually more expedient to have two transducers, side-by-side, using one for transmitting signals representative of acoustic energy and the other for receiving signals representative of acoustic energy, for each has separate and distinct circuits specifically designed for the distinctly different energy levels. However, such a design results in an unnecessary duplication of components.

SUMMARY OF THE INVENTION

The present invention is directed to providing a device for coupling an electromechanical transducer to a tuned transmitter and an identically tuned receiver. A coupling transformer secondary connecting the transmitter to the transducer is substantially constructed to transfer a high-power transmitted signal and is designed to provide an inductance electrically cooperating with the capacitance inherently found in a piezoelectric transducer to ensure an electrically tuned transfer of the transmitted signal. A relay is connected across the transmitter-transformer secondary to short out the secondary whenever a high-energy transmitted signal is not being transmitted. The primary of a receiver-transformer is serially connected with the transmitter-transformer secondary and a pair of back-to-back diodes are shunted across the primary. Whenever a high-power transmitted signal appears across the secondary of the transmitter-transformer, the back-to-back diodes effectively short out the primary winding of the receive-transformer to permit the transmission of an undistorted signal. When the transducer is receiving acoustic energy and producing a representative received signal, the relay has already shorted out the secondary winding of the transmitter-transformer. Since the received signal is below the forward voltage drop of the back-to-back diodes in the microvolt range, the diodes provide a load resistance permitting the received signal to be impressed across the primary of the receiver-transformer. Both the transmitter-transformer and the receiver-transformer have permeabilities ensuring the proper inductance for creating an improved or unity power factor in the transducer-transceiver when operating in the transmit mode or receive mode.

It is the prime object of the instant invention to provide the coupling circuit linking a transducer to a tuned transmitter circuit and a tuned receiver circuit.

Another object is to provide circuitry permitting a single transducer to be substantially, identically tuned for reception and transmission.

Yet another object is to provide a coupling circuit employing two transformers joining separate transmit and receive circuitry to a transducer.

Yet another object is to provide a coupling circuitry that is simple and inherently of high reliability.

These and other objects of the invention will become readily apparent from the ensuing specification when taken with the drawings.

PREFERRED EMBODIMENT OF THE INVENTION

Figure 1:
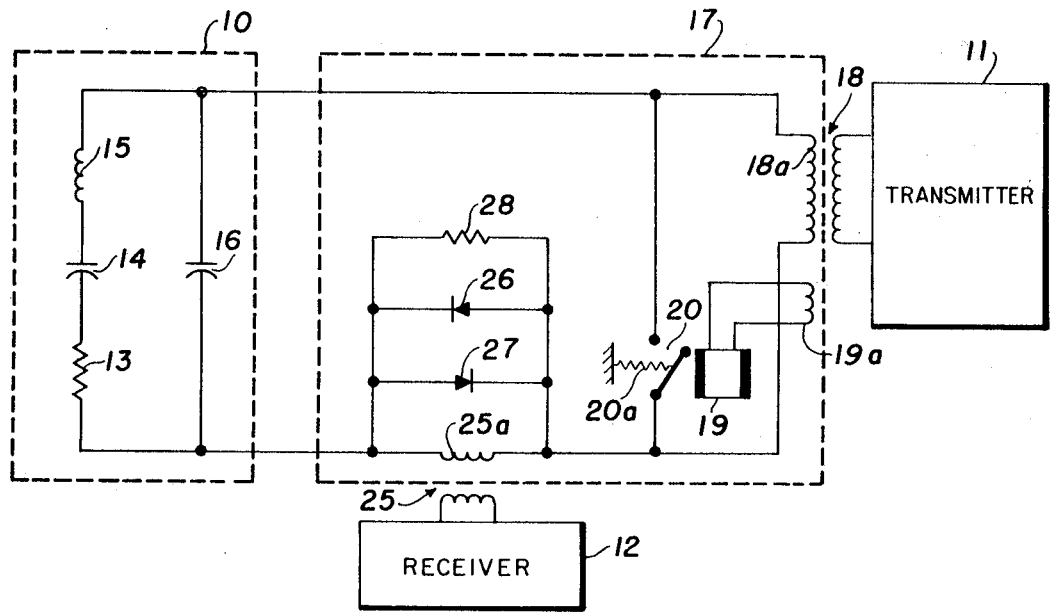
FIG. 1 shows a circuit diagram of the invention.

Referring now to the drawings, the instant invention is provided to electrically couple an electromechanical transducer 10 to a high-power transmitter circuit 11 and a sensitive receiver circuit 12. The transducer, usually formed of piezoelectric or piezoceramic materials, is equivalently represented by electric circuit components as a resistance 13, capacitance 14, and inductance 15 arranged in series, connected in parallel with a capacitance of large magnitude 16, representing the clamped capacity of the ceramic elements. Specific values are not given since the relative magnitudes vary from transducer to transducer.

The magnitude of clamped capacitance 16 is relatively high resulting from the sandwiching of piezoelectric discs and conductive films or leafs. Thus, the transducer's input impedance tends to pass a complex signal having the current leading the voltage by a disproportionate angle resulting in considerable losses and poor circuit efficiency.

To remedy this undesirable low efficiency, it is common practice to introduce inductance into a coupling circuit or the driving and receiving circuits to create a substantially unity power factor. The invention employs a coupling circuit 17 including a transmit-transformer 18 and a receiver-transformer 25. Inductive coupling between transmitter and transducer uses a transformer secondary 18a linking the transducer to the internal circuitry of the transmitter. The transformer is sufficiently constructed to reliably transfer high potentials ranging in the thousands of volts and is dimensioned and formed to provide an inductive reactance at the high-power transmitting level, equal to the capacitive reactance provided by representative clamped capacitance 16. In this manner, a unity power factor is created during transmission.

A relay 19 having a bleeder winding 19a, is actuated to close a spring-biased pair of contacts 20 only when the transmitter is not transmitting. The biasing spring 20a normally holds the contacts together when the transmitter is not transmitting, and when lines of magnetic flux are induced to pass through the bleeder winding, the relay is energized and the contacts are opened. Upon cessation of transmission, the biasing spring 20a closes the contacts and the transmit-transformer 18 is shorted from the rest of the coupling circuit.

Receiver circuit 12 is similarly connected into the coupling circuit by a receiver-transformer 25. The receiver transformer has its primary winding 25a suitably designed to provide a sufficient inductive reactance impedance to offset the capacitive reactance of the transducer when operating in the microvolt range. Connected across the receiver-transformer primary, a pair of back-to-back coupled diodes 26 and 27 provide a shunting bypass for the primary winding 25a when the transmitter 11 emits high transmitting power. Shunting out the primary winding eliminates the possibility of its damage as well as blanking out its inductive reactance from the transmitter-transducer circuit. Failure to blank this additional inductive reactance will introduce an overcompensation of the transducer's capacitive reactance resulting in an inefficient energy transfer. A resistor 28 of definite magnitude is connected in parallel with the diodes and the receive-transformer primary, the purpose of which will be explained below.

From the foregoing, it is apparent that during the transmit cycle of operation, transmitter 11 is coupled to the receiver through the coupling circuit via the transmit-transformer 18 and the receiver is shorted out of the transmitter-transducer circuit by shunting back-to-back diodes 26 and 27. In this way, a tuned transfer of high energy is passed to the transducer.

When the transmitter stops transmitting, relay 19 becomes deenergized, and biasing spring 20a forces spring bias contacts 20 together to short the transmitter out of the circuit. Upon receiving impinging acoustic energy on piezoelectric elements in transducer 10, a representative output signal, of a magnitude considerably lower than the transmitted energy, is created. Coupling circuit 17 passes the representative output signal through primary winding 25a of the receive-transformer. Because the back-to-back diodes both have a forward voltage drop of approximately 0.5 volts, the resistance offered by the diodes causes smaller received signals to be impressed across the primary winding. The representative signals produced by the transducer usually range in magnitude between 10 and 100 microvolts, and, thusly, are not shunted past, but are impressed across primary winding. Since the diode's resistance characteristic is essentially nonlinear, including resistor 28 having a known resistance, provides a known load for enabling a more precise signal analysis in receiving circuit 12.

Using two transformers, separately coupling the receiver and transmitter to the transducer, is necessary to enable the transmission of acoustic energy within a predetermined pass band and for the transducer-receiver circuit's processing a reflected information signal within the identical pass band. Such tuning is dependent upon the circuit elements employed on opposite sides of both the transmit-transformer and the receive-transformer. Both transformers, including high permeability cores, create changed levels of induction when transmitting at a high power or receiving at a lower power. Since the inductance of the transformers is a function of the applied voltage, matching the Q's on the primary and the secondary sides of either the transmit or receive transformer to achieve desired tuning characteristics on both sides is dependent upon the magnitudes of applied driving potentials. It obviously follows, that balancing the inductive reactance of the transformers to the clamping capacitive reactance of the transducer is also dependent upon the level at which the transformers are driven. By selecting a transmit-transformer 18 having a high permeability core for producing the desired inductance for Q balancing, and for achieving a unity power factor, while being driven at many thousands of volts, and, by selecting a receive-transformer providing Q balancing and a unity power factor while receiving signals in the microvolt range, an identically tuned transmit-receive transducer is formed. Such transformers are readily found within the state of the art and representative examples and values are omitted for the sake of simplicity.

Figure 2:
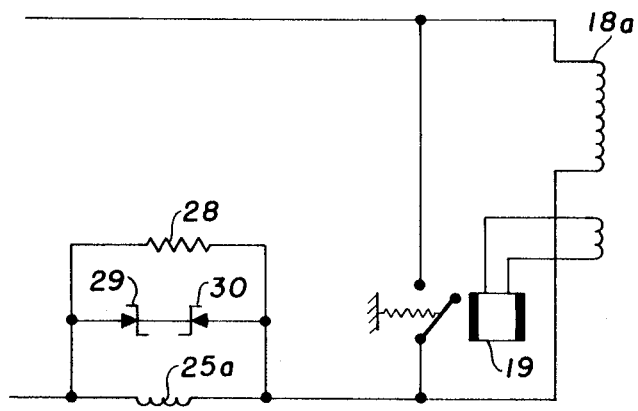
FIG. 2 is a circuit diagram of another embodiment of the invention.

As an alternate to the circuit shown in FIG. 1, FIG. 2 depicts the use of a pair of zener diodes 29 and 30 included with identical elements shown in coupling circuit 17, the only exception in their employment being that their breakdown voltage is greater than diodes 26 and 27 and are employed where larger signals are encountered due to received acoustic energy at a higher level or preamplification.

Obviously many modifications and variations of the present invention are possible in the light of the above teachings and it is therefore understood that within the scope of the disclosed inventive concept, the invention may be practiced otherwise than as specifically described.

What is claimed is:

1. A device for coupling an electromechanical transducer to a tuned transmitter and an identically tuned receiver comprising:

a first inductor configured for coupling a high-power transmitted signal from said tuned transmitter to said transducer being constructed to provide an inductive reactance electrically cooperating with the capacitive reactance of said transducer to ensure an electrically tuned transfer of said transmitted signal;

a switching means connected across said first inductor adapted to short thereacross during periods of nontransmission;

a second inductor serially connected with said first inductor and configured for coupling a low-power received signal from said transducer to said tuned receiver being constructed to provide an inductive reactance electrically cooperating with said capacitive reactance to ensure an identical said electrically tuned transfer of said received signal; and a shunting circuit connected across said second inductor including, bidirectional conducting means in the form of a pair of back-to-back diodes having a forward voltage drop of lesser magnitude than said transmitted signal and of greater magnitude than said received signal, upon transmitting said high-power transmitted signal, effectively shorting said receiver and a shunt resistor for receiving said low-power received signal to provide a linear load for passing said received signal to said second inductor and to said tuned receiver.

2. A device according to claim 1 in which said switching means is a relay energized to remain in the open position during transmission and in the closed position during nontransmission.

3. A device according to claim 2 in which said first inductor is the secondary of a transformer formed of materials having a permeability ensuring a predetermined tuned response to said high-power transmitted signal.

4. A device according to claim 3 in which said second inductor is the primary of a transformer formed of materials having a permeability ensuring an identical predetermined tuned response to said low-power received signal.